US00RE42341E

(19) United States
(12) Reissued Patent
Jung

(10) Patent Number: US RE42,341 E
(45) Date of Reissued Patent: *May 10, 2011

(54) APPARATUS AND METHOD FOR PROCESSING AUDIO SIGNALS RECORDED ON A MEDIUM

(75) Inventor: Han Jung, Seoul (KR)
(73) Assignee: LG Electronics Inc., Seoul (KR)

( * ) Notice: This patent is subject to a terminal disclaimer.

(21) Appl. No.: 11/905,506

(22) Filed: Oct. 1, 2007

Related U.S. Patent Documents

Reissue of:
(64) Patent No.: 6,721,249
Issued: Apr. 13, 2004
Appl. No.: 09/209,280
Filed: Dec. 11, 1998

U.S. Applications:

(63) Continuation of application No. 11/058,630, filed on Feb. 16, 2005, which is a continuation of application No. 10/848,616, filed on May 19, 2004, now abandoned, which is a division of application No. 08/735,572, filed on Oct. 23, 1996, now Pat. No. 6,535,467, which is a continuation of application No. 08/307,288, filed on Sep. 16, 1994, now abandoned.

(30) Foreign Application Priority Data

Sep. 17, 1993 (KR) ..... 93.18841

(51) Int. Cl.
*G11B 7/005* (2006.01)

(52) U.S. Cl. ..... 369/47.16; 369/47.2; 369/47.23; 369/53.37; 386/97; 386/99

(58) Field of Classification Search ..... None
See application file for complete search history.

(56) References Cited

U.S. PATENT DOCUMENTS 4,757,393 A 7/1988 Dakin et al.

(Continued)

FOREIGN PATENT DOCUMENTS

EP 0 710 491 A1 5/1996

(Continued)

OTHER PUBLICATIONS

Sugahara et al., MPEG1 CD, "An application of MPEG1 coding technology for KAROKE–CD moving picture," ITEJ Technical Report, The Institute of Television Engineers of Japan, vol. 17, No. 20, Mar. 1993, pp. 13–18.

*Primary Examiner*—Muhammad N. Edun
(74) *Attorney, Agent, or Firm*—Birch, Stewart, Kolasch & Birch, LLP

(57) ABSTRACT

[This invention relates to a karaoke CD format and a device for controlling audio signals utilizing the karaoke CD format which provides a user with selective reproduction of the voice of a player. The karaoke CD format includes a CD format divided into video sectors and audio sectors. The audio sectors are further divided into a part for recording accompaniment sound and playing sound at the same time and a part for recording accompaniment sound only. There is provided record coding information for distinguishing the parts.] *A device, method and recording medium for reproducing digital data, are discussed. According to an embodiment, the apparatus includes a demultiplexer configured to separate digital video data from digital audio data; a data processor configured to process the digital video data and at least one of first and second types of digital audio data; an audio/video presentation part configured to compare a system time reference with a presentation time information to control a presentation timing of the digital video data and compare the system time reference with a presentation time information to control a presentation timing of at least one of the first and second types of digital audio data, the system time reference being provided by a system time clock circuit; and a control circuit to output a video data and an audio data corresponding to the first or second types, based on second information.*

47 Claims, 6 Drawing Sheets

U.S. PATENT DOCUMENTS

| | | | |
|---|---|---|---|
| 5,126,981 | A | 6/1992 | Kim et al. |
| 5,177,728 | A | 1/1993 | Otsubo et al. |
| 5,257,253 | A | 10/1993 | Otsubo et al. |
| 5,289,288 | A | 2/1994 | Silverman et al. |
| 5,359,463 | A | 10/1994 | Shirochi et al. |
| 5,475,499 | A | 12/1995 | Taguchi et al. |
| 5,497,241 | A | 3/1996 | Ostrover et al. |
| 5,555,098 | A | 9/1996 | Parulski |
| 5,850,500 | A | 12/1998 | Hirayama et al. |
| 5,933,398 | A | 8/1999 | Fujinami et al. |
| 6,535,467 | B1 | 3/2003 | Jung et al. |

FOREIGN PATENT DOCUMENTS

| | | | |
|---|---|---|---|
| JP | 01-232573 | A | 9/1989 |
| JP | 2-235260 | A | 9/1990 |
| JP | 2-296413 | A | 12/1990 |
| JP | 3-128586 | A | 5/1991 |
| JP | 4-265569 | A | 9/1992 |
| JP | 5-12831 | A | 1/1993 |
| JP | 05-236009 | A | 9/1993 |
| JP | 7-152391 | A | 6/1995 |
| WO | WO-93/13626 | A1 | 7/1993 |
| WO | WO-01/39836 | A1 | 6/2001 |

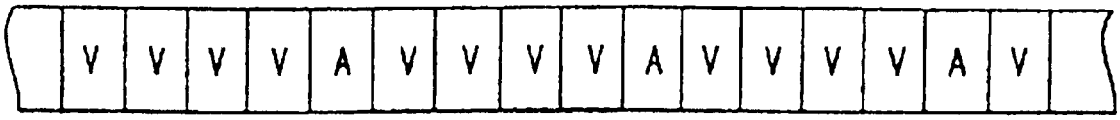
FIG.3
PRIOR ART
| | MPEG VIDEO | MPEG AUDIO |
|---|---|---|
| FILE NUMBER | SEQUENCE NUMBER | SEQUENCE NUMBER |
| CHANNEL NUMBER | $ 01 | $ 01 |
| SUBMODE | %x11x001x | %x11x010x |
| CODING NUMBER | $ 0F | $ 7F |
FIG.4
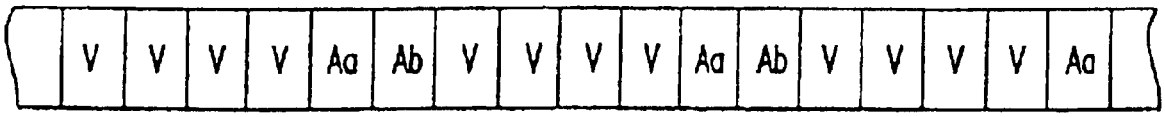
FIG.5

APPARATUS AND METHOD FOR PROCESSING AUDIO SIGNALS RECORDED ON A MEDIUM

Matter enclosed in heavy brackets [ ] appears in the original patent but forms no part of this reissue specification; matter printed in italics indicates the additions made by reissue.

*CROSS-REFERENCES TO RELATED APPLICATIONS*

*This application is a continuation of co-pending U.S. Reissue application Ser. No. 11/058,630 fled on Feb. 16, 2005, which is a continuation of U.S. Reissue application Ser. No. 10/848,616 filed on May 19, 2004 (now abandoned), which is a reissue of U.S. Pat. No. 6,721,249 (application Ser. No. 09/209,280 filed Dec. 11, 1998), which is a divisional of U.S. application Ser. No. 08/735,572 filed Oct. 23, 1996 (U.S. Pat. No. 6,535,467), which is a continuation of U.S. application Ser. No. 08/307,288 filed Sep. 16, 1994 (now abandoned). The present application also claims foreign priority benefits of Korean Patent Application No. 93-18841 filed Sep. 17, 1993 in the Republic of Korea. The entirety of each of the above-identified documents is hereby incorporated by reference. Note: More than one reissue application has been filed for the reissue of U.S. Pat. No. 6,721,249. The reissue applications are application Ser. Nos. 10/848,616 (grandparent of the present application); 11/058,630 (parent of the present application); 10/848,617 (now abandoned); 11/905,506 (present application); 12/142,642; 12/142,658; 12/142,663; 12/142,674; 12/142,680; and 12/142,684.*

This is a division of application Ser. No. 08/735,572, filed Oct. 23, 1996, now U.S. Pat. No. 6,535,467, which is a continuation of 08/307,288, filed Sep. 16, 1994, now abandoned.—all of which are incorporated herein by reference.

BACKGROUND OF THE INVENTION

1. Field of the Invention

This invention relates to a karaoke CD system, more particularly to a karaoke CD format and a device for processing audio signals utilizing the karaoke CD format which provides a user with selective reproduction of the voice of a player.

2. Description of Related Art

As shown in FIG. 1, a general disc data layout of a karaoke CD includes lead in/lead out areas 1 and 6 formed at the lead in and lead out of the CD for encoding CD-ROMXA data containing empty sectors of mode 2/form 2 therein, and program areas 2, 3, 4, and 5.

The program areas include a volume descriptor area 2 formed next to the lead in area 1 containing the path name of a CDI application program described in compact disc bridge system description. The basic data area 3 is for recording the title of a song, the name of the singer, the composer of the song, and the songwriter. The CDI application program area 4 is for recording an application program required for converting into compact disc bridge system description which will facilitate the operation of a disc in CD-RTOS (Real Time Operating System) in a CD-I/FMV player. The MPEG data area 5 is for recording MPEG (Moving Picture Experts Group) video and audio data.

The lead in area 1 has records of the number of songs, the period of time of each song and total period of time, and the lead in part and index part of each song. The lead out area 6 has record of the end of the program.

As shown in FIG. 2, a conventional karaoke CD system includes a first demodulation part 11 for demodulating EFM (Eight to Fourteen Modulation) signals. A second modulation part 12 for demodulating signals recorded in interleaved sectors for a CD-ROM upon receiving signals from the first demodulation part 11. A CPU 16 for demultiplexing system flow on receiving signals from the second demodulation part 12. A first, and a second memory 17 and 18 for storing video and audio data received from the CPU 16 respectively. A MPEG video decoder 19 and a MPEG audio decoder 20 for decoding MPEG video signals and MPEG audio signals of the video and audio data stored in the first and the second memories 17 and 18 respectively. A STC (System Time Clock) 23 for clocking the system time under the control of the CPU 16. A video and audio signal processing part 13 having a video presentation part 21 for comparing the STC of the STC part 23 to PTS (Presentation Time Stamps) in the bit stream received from the MPEG video decoder 19. An audio presentation part 22 for comparing the STC of the STC part 23 to PTS (Presentation Time Stamps) in the bit stream received from the MPEG audio decoder 20. A control part 10 for controlling both the first and the second demodulation parts 11 and 12 and for controlling the video and audio signal processing part 13 according to a key signal applied thereto. A Digital-to-Analog (D/A) converter 14 for converting the video signal received from the video presentation part 21 and outputting the converted signal to a monitor under the control of the control part 10, and a D/A converter 15 for converting the audio signal received from the audio presentation part 22 and applying the converted signal to a speaker under the control of the control part 10.

The interleaving of a conventional MPEG video and MPEG audio sectors is as shown in FIG. 3.

Since the quantity of MPEG video data is much greater than the quantity of MPEG audio data, an MPEG audio sector A is periodically positioned in between MPEG video sectors V. For example, one MPEG audio sector A may be present in every four MPEG video sectors V.

Shown in Table 1 is the audio channel encoding, which is to be explained in detail hereinafter.

TABLE 1

| | Stereo Program | Special Music Program |
|---|---|---|
| CH 0 | Left | mono without vocal |
| CH 1 | Right | mono with vocal |

The karaoke CD format includes a stereo music program having a left audio channel for encoding on MPEG audio channel 0 and a right audio channel for encoding on MPEG audio channel 1, and a special music program having one channel for encoding music accompaniment sound without vocal and the other channel for encoding music accompaniment sound with vocal.

Operation of the conventional karaoke CD system is to be explained hereinafter.

The karaoke data is read in through a pick-up, having EFM demodulated and CD errors corrected through the first demodulation part 11 which is an EFM/CIRC (Cross Interleave Read Solomon Code) decoder. The data interleaved at encoding is demodulated through the second demodulation part 12 which is a CD-ROM decoder. The data is divided into audio data and video data through the video and audio signal processing part 13 under the demultiplexing operation of the CPU 16 and applied to the MPEG video decoder 19 and MPEG audio decoder 20 through the first and the second memories 17 and 18 respectively.

The MPEG video decoder 19 and the MPEG audio decoder 20, restore the compressed data, and compare the STC from the STC part 23 to the PTS in the restored data to control the presentation time of the data.

However, such a conventional karaoke-CD system has the disadvantage of being unable to obtain stereophony sound in the case where music without vocal and music with vocal of a specific music program is carried on the first channel (Left) and the second channel (Right).

SUMMARY OF THE INVENTION

The object of this invention is to provide a user with selective reproduction of playing sound, i.e., voice (song of a singer) and accompaniment sound.

These and other objects and features of this invention can be achieved by providing a karaoke CD format which is divided into video sectors and audio sectors, and the audio sectors are further divided into a part for recording accompaniment sound and vocal sound at the same time and another part for recording accompaniment sound only. The audio sectors are further provided to record coding information for distinguishing between the audio data stored in the two parts. There is provided a device for controlling audio signals using a karaoke CD format including a control means for controlling the entire system according to signals applied from outside the system. There is provided a demodulation means for demodulating a signal read in from a CD which distinguishes between a part containing recorded accompaniment sound and vocal sound at the same time, and another part containing recorded accompaniment sound only under the control of the control means. There is provided an audio signal processing means for processing audio signals using signals received from the demodulation means and transmitting data corresponding to a first data signal corresponding to the accompaniment sound and playing sound and a second data signal corresponding to the playing sound only, a switching means for selecting one of the first or second data signals and outputting the selected data under the control of the control means, and a D/A converting means for converting the data received from the switching means and applying the converted data to a speaker under the control of the control means.

*According to one embodiment, the present invention is directed to a recording medium on which digital video data and digital audio data are recorded, the digital video data comprising data units, and the digital audio data comprising data units corresponding to at least one of: a first type of digital audio data; and a second type of digital audio data which includes at least one content different from the first type of digital audio data; each data unit of digital audio data including supplementary information, which has: coding information for indicating a coding mode of the digital audio data, identification information, different than the coding information, for identifying one of the first type of digital audio data or the second type of digital audio data, wherein the identification information is used for separating the data units of the first type from the data units of the second type and selectively outputting the first or second types of digital audio data, and time information for representing a presentation timing of data units of the first type or second type so that the selected digital audio data is output together with the digital video data in synchronous manner, wherein one digital video data is associated with the two types of digital audio data.*

*According to one embodiment, the present invention is directed to an apparatus for reproducing a digital data, the digital data including a digital video data and a digital audio data, the digital video data and the digital audio data being composed of data units respectively, and the data units of digital audio data corresponding to at least one of: 1) a first type of digital audio data, and 2) a second type of digital audio data which includes at least one content different from the first type of digital audio data; the digital data including a mode information for indicating a coding mode of the digital video data, and attribute information, which has: a) first information for indicating a coding mode of the digital audio data, and b) second information, different than the first information, for identifying one of the first type of digital audio data and the second type of digital audio data, the apparatus comprising: a demultiplexer configured to separate the digital video data from the digital audio data; a data processor configured to process the digital video data and at least one of the first and second types of digital audio data; an audio/video presentation part configured to compare a system time reference with a presentation time information to control a presentation timing of the digital video data and compare the system time reference with a presentation time information to control a presentation timing of at least one of the first and second types of digital audio data, the system time reference being provided by a system time clock circuit; and a control circuit coupled to the data processor and the audio/video presentation part to output a video data and an audio data corresponding to the first or second types, based on the second information.*

*According to one embodiment, the present invention is directed to a method of reproducing a digital data, the digital data including a digital video data and a digital audio data, the digital video data and the digital audio data being composed of data units respectively, and the data units of digital audio data corresponding to at least one of: 1) a first type of digital audio data, and 2) a second type of digital audio data which includes at least one content different from the first type of digital audio data; the digital data including a mode information for indicating a coding mode of the digital video data, and attribute information, which has: a) first information for indicating the digital audio data, and b) second information, different than the first information, for identifying one of the first type of digital audio data or the second type of digital audio data, the method comprising: separating the digital video data from the digital audio data; processing the digital video data and at least one of the first and second types of digital audio data; comparing a system time reference with a presentation time information to control a presentation timing of the digital video data and comparing the system time reference with a presentation time information to control a presentation timing of at least one of the first and second types of digital audio data; and controlling an output of a video data, and an audio data corresponding to the first or second types, based on the second information.*

*According to one embodiment, the present invention is directed to an apparatus for processing a digital data, the digital data including a compressed digital video data and a compressed digital audio data, the digital video data and audio data being composed of data units respectively, data units of digital audio data being multiplexed along with data units of digital video data, and the data units of digital audio data corresponding to at least one of: 1) a first type of digital audio data, and 2) a second type of digital audio data which includes at least one content different from the first type of digital audio data; the digital data including ID information*

*for indicating the digital video data, and attribute information, which has: a) first information for indicating a coding mode of the digital audio data, and b) second information, different than the first information, for identifying one of the first type of digital audio data or the second type of digital audio data, the apparatus comprising: a demultiplexer configured to separate the data units of the digital video data from the data units of the digital audio data; a data storage configured to store the digital video data and the digital audio data separated by the demultiplexer, respectively; a data processor configured to receive the digital video data and at least one of the first and second types of digital audio data stored in the data storage and process the digital video data and at least one of the first and second types of digital audio data, respectively, the data processor including a decoder configured to decode the compressed digital video data and the compressed digital audio data; an audio/video presentation part configured to compare a system time reference with a presentation time information to control a presentation timing of the digital video data and compare the system time reference with a presentation time information to control a presentation timing of at least one of the first and second types of digital audio data, the system time reference being provided by a system time clock circuit: and a control circuit coupled to the data processor and the audio/video presentation part to output a video data and an audio data corresponding to the first or second types, based on the second information.*

*According to one embodiment, the present invention is directed to a method of processing a digital data, the digital data including a compressed digital video data and a compressed digital audio data, the digital video data and audio data being composed of data units respectively, data units of digital audio data being multiplexed along with data units of digital video data, and the data units of digital audio data corresponding to at least one of: 1) a first type of digital audio data, and 2) a second type of digital audio data which includes at least one content different from the first type of digital audio data; the digital data including ID information for indicating the digital video data, and attribute information, which has: a) first information for indicating the digital audio data, and b) second information, different than the first information, for identifying one of the first type of digital audio data or the second type of digital audio data, the method comprising: separating the data units of the digital video data from the data units of the digital audio data; storing the digital video data and the digital audio data separated by the separating step, respectively; processing the digital video data and at least one of the first and second types of digital audio data, respectively, the processing step including decoding the compressed digital video data and the compressed digital audio data; comparing a system time reference with a presentation time information to control a presentation timing of the digital video data and comparing the system time reference with a presentation time information to control a presentation timing of at least one of the first and second types of digital audio data; and controlling an output of a video data and an audio data corresponding to the first or second types, based on the second information.*

BRIEF DESCRIPTION OF THE DRAWINGS

FIG. 3 is a diagram showing a conventional interleaving of MPEG audio/video sectors.

FIG. 4 is a diagram of a subheader in accordance with this invention.

FIG. 5 is a diagram showing an interleaving of MPEG audio/video sectors in accordance with this invention.

DETAILED DESCRIPTION OF THE INVENTION

This invention is to be explained in detail hereinafter, referring to the attached drawings.

A subheader in accordance with this invention is shown in FIG. 4. To distinguish audio data Aa, containing both vocal sound and accompaniment sound, and audio data Ab, containing only accompaniment data, there is provided subheader information in an audio packet, the subheader includes coding information encoded therein with a distinguishing value applied thereto.

The coding information is, included into a subheader of each sector at data encoding as a distinguishing value, standardized as $0 F in case of MPEG video, and $7 F in case of MPEG audio, wherein new coding information (for example 3 F) is added to use for a distinguishing signal for the audio data sector Aa, having both vocal sound and accompaniment sound, and the audio data sector Ab having only accompaniment sound.

Interleaving of MPEG video and MPEG audio sectors is as shown in FIG. 5. The interleaving of video data and audio data sectors, in general has 4 to 5 consecutive video sectors V with one audio sector A added thereto, where coding information is used to distinguish a sector containing the encoded Aa and Ab.

Since the increase of buffer size due to the newly added audio sectors Aa and Ab is infinitesimal compared to the image data, it can be ignored.

That is, the karaoke CD format in accordance with this invention includes a CD format divided into video sectors and audio sectors, and the audio sectors are further divided into a part Aa for recording both accompaniment sound and vocal sound at the same time and a part Ab for recording accompaniment sound only, and the audio sectors are further provided to record coding information for distinguishing between audio data stored in the two parts.

Figure 1:
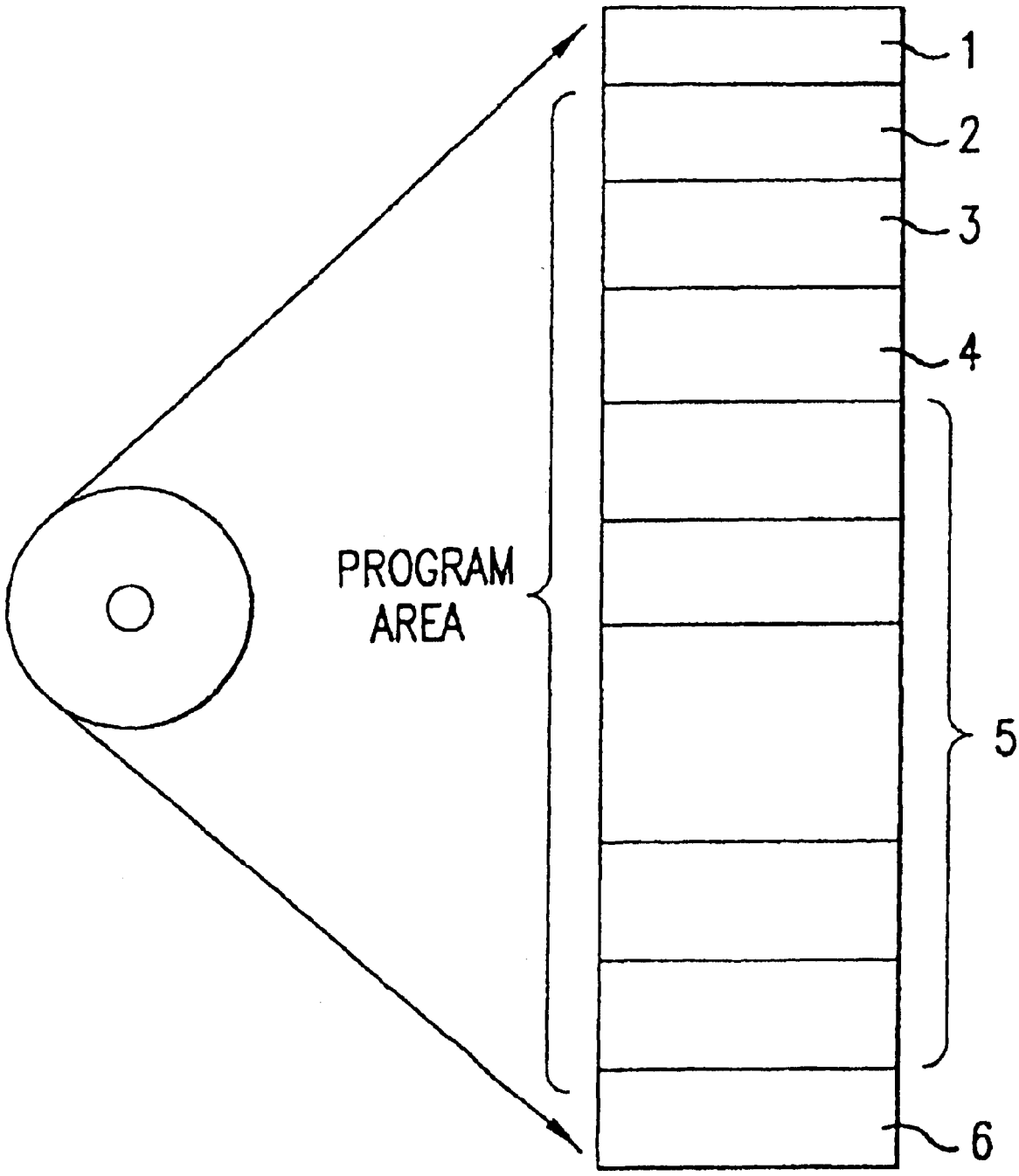
FIG. 1 PRIOR ART
FIG. 1 is a layout of a karaoke CD data.
Figure 2:
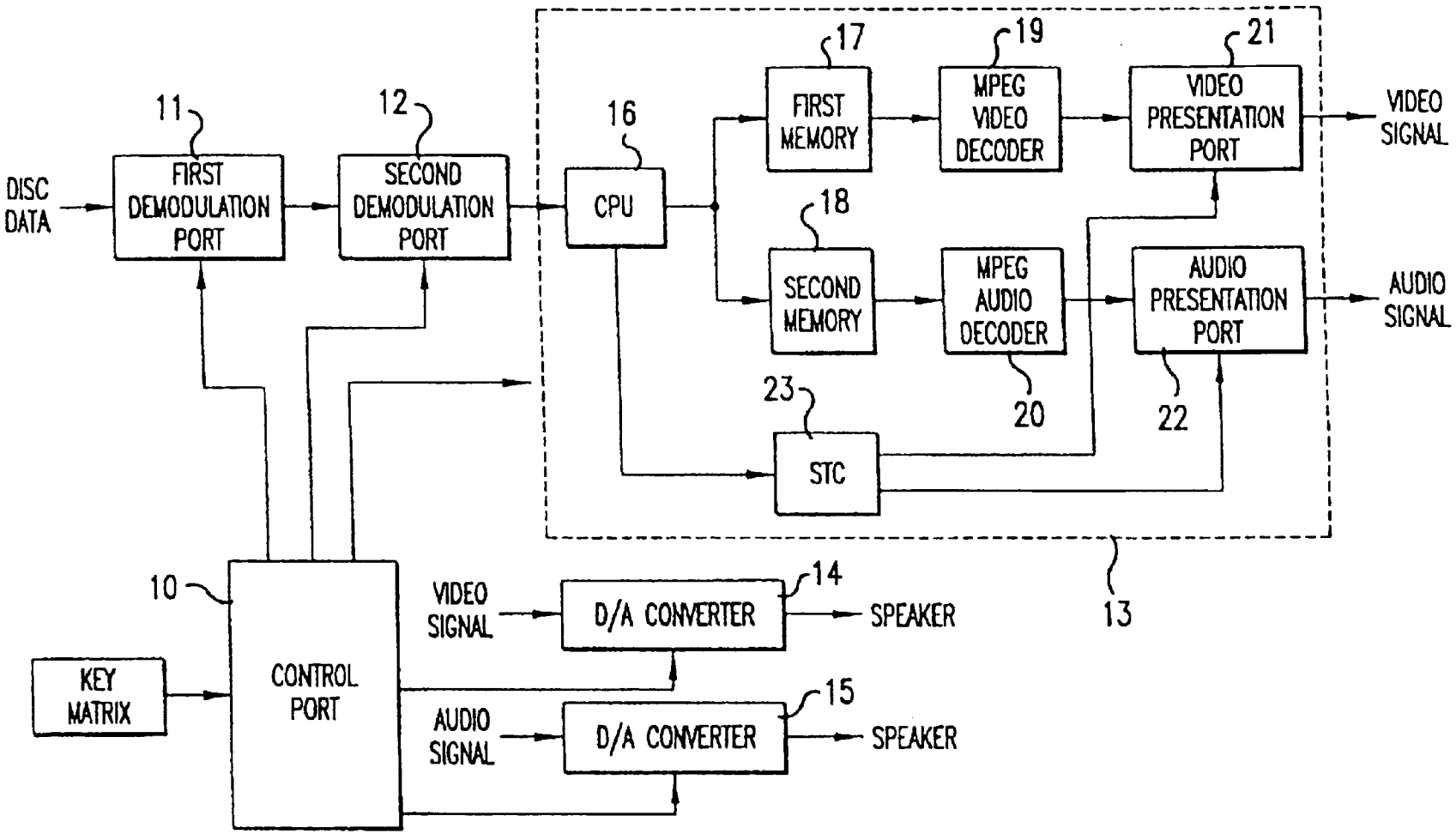
FIG. 2 PRIOR ART
FIG. 2 is a block diagram of a conventional karaoke CD system.
Figure 6:
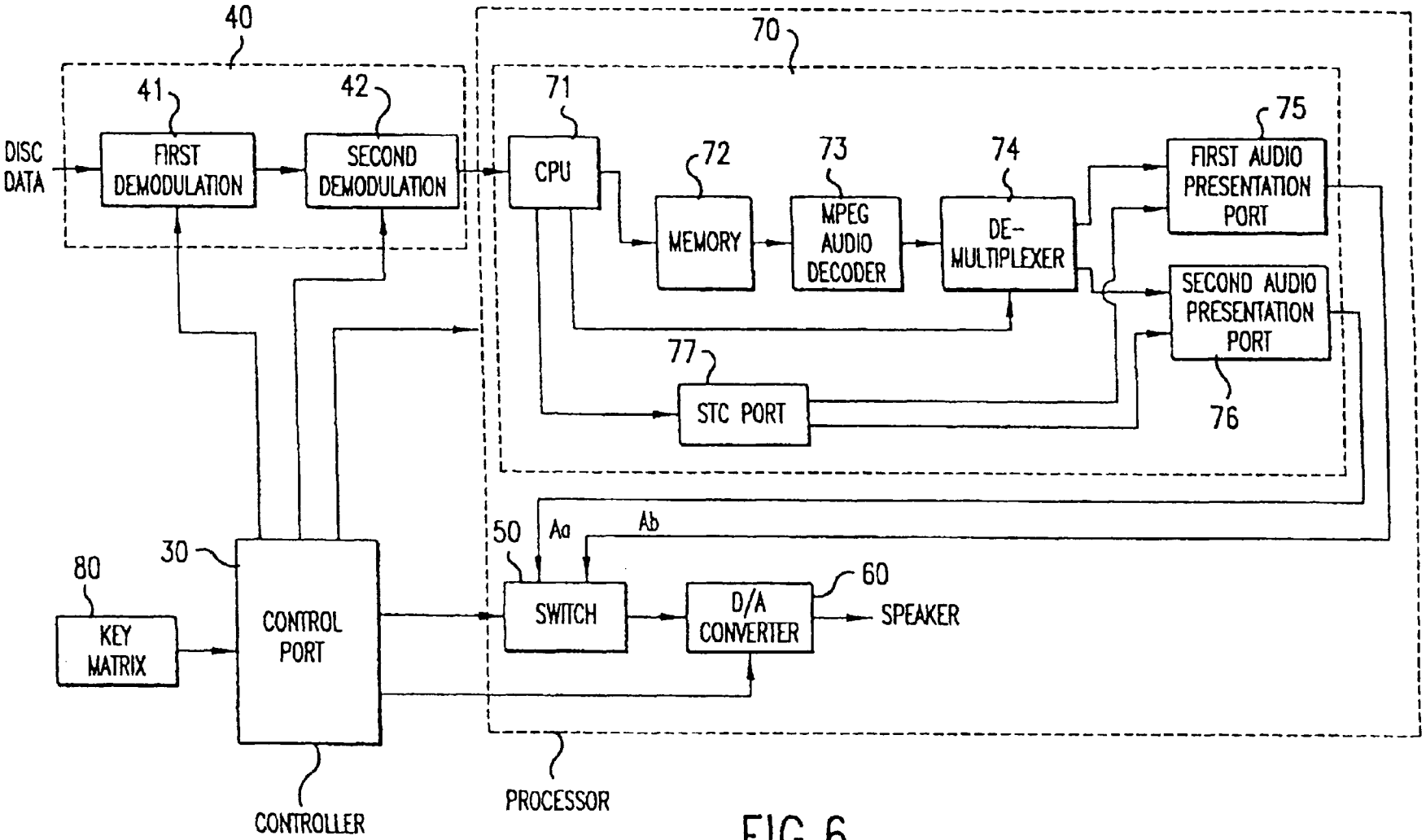
FIG. 6 is a schematic block diagram of a device for controlling karaoke CD audio signal in accordance with this invention.

As shown in FIG. 6, a device for controlling a karaoke CD audio signal in accordance with this invention in a state having the audio data interleaved as explained above, includes a control part 30, a demodulation part 40, an audio signal processing part 70, a switch 50, and a D/A converting part 60.

The control part 30 controls the entire system according to the signal applied through a key matrix 80.

The demodulation part 40 includes a first demodulator 41 for carrying out EFM demodulation from the CD format provided to distinguish a part Aa for recording accompaniment sound and vocal sound at the same time, and a part Ab for recording accompaniment sound only, where the part is under the control of the control part 30, and a second demodulator 42 for demodulating signals recorded in interleaved sectors for a CD-ROM from the signal received from the first demodulator 41 and applying the second demodulated signal to the audio processing part 70 under the control of the control part 30, thereby demodulating the signal read in from the CD format provided to distinguish a part Aa, for recording accompaniment sound and vocal sound at the same time, and a part Ab, for recording accompaniment sound only, under the control of the control part 30.

The audio signal processing part 70 includes a CPU 71 for separating audio data and time data from the signal received from the second demodulator 42 under the control of the control part 30, a STC (System Time Clock) part 77 for generating a synchronizing signal using time information received from the CPU 71, a memory 72 for storing the audio data received from the CPU 71, an MPEG audio decoder 73 for decoding the MPEG audio data stored in the memory 72, a demultiplexer 74 for separating data received form the MPEG audio decoder 73 into data corresponding to accompaniment sound and vocal sound and data corresponding to accompaniment sound and outputting the separated data under the control of the CPU 71, a first audio presentation part 75 for comparing the PTS (Presentation Time Stamp) in the data corresponding to the accompaniment sound received from the demultiplexer 74 to the signal received from the STC 77 to control presentation time of the data, and a second audio presentation part 76 for comparing the PTS (Presentation Time Stamp) in the data corresponding to accompaniment sound and vocal sound received from the demultiplexer 74 to the signal received from the STC 77 to control presentation time of the data, thereby processing the audio signal using signals received from the demodulation part 40 to separate the data into data corresponding to a first data containing accompaniment sound only, and outputting the separate data.

The switch 50 selects one of the data corresponding to the accompaniment sound and vocal sound, or to only the accompaniment sound received from the first and the second audio presentation parts 75 and 76 of the audio signal processing part 70 and transmits the selected data under the control of the control part 30.

The D/A converter 60 converts the data received from the switch 50 under the control of the control part 30.

The system and operation for processing a video signal is the same as for a conventional karaoke CD system.

Operation of the device for controlling a karaoke CD audio signal in accordance with this invention as described above is to be explained hereinafter.

The encoded karaoke-CD data having coding information applied thereto is added with a distinguishing value and has EFM signals demodulated through the first demodulation part 41 which is a EFM/CIRC (Cross Interleave Read Solomon Code) and errors of the CD are corrected. The interleaved data at encoding is demodulated through the second demodulation part 42 which is a CD-ROM decoder, and is separated into audio, video, and time data in the CPU 71.

In the instant, of audio data, the demultiplexing signal coming in at the reading in of the coding information is applied to the demultiplexer 74 for operation of the demultiplexer 74.

Of the data demultiplexed in the CPU 71, the MPEG audio data is stored in the memory 72 temporarily, has the compression restored through the MPEG audio decoder 73, and is transmitted. The demodulated audio data received from the MPEG audio decoder 73 is separated into audio data carrying accompaniment sound only and audio data carrying accompaniment sound and vocal sound through the demultiplexer 74, and applied to the first audio data presentation part 75 and the second audio presentation part 76 respectively under the control of the CPU 71.

The audio demultiplexing signal received from the CPU 71 controls the first audio presentation part 75 to compare the received audio data Ab, carrying accompaniment sound only out of the audio signal applied thereto, to a PTS to control the presentation time and controls the second audio presentation part 76 to compare the received audio data Aa, carrying voice, i.e., vocal sound and accompaniment sound out of the audio signal applied thereto to a PTS to control the presentation time. The audio data received from the first and the second audio presentation parts 75 and 76 is applied to the D/A converter 60 through a switching operation of the switch 50 under the control of the control part 30, where it is converted in the D/A converter 60 and output to a speaker.

In this instant, the switch 50 is operated under the control of the control part 30 which is operated according to the key signal applied through the key matrix 80.

Figure 7:
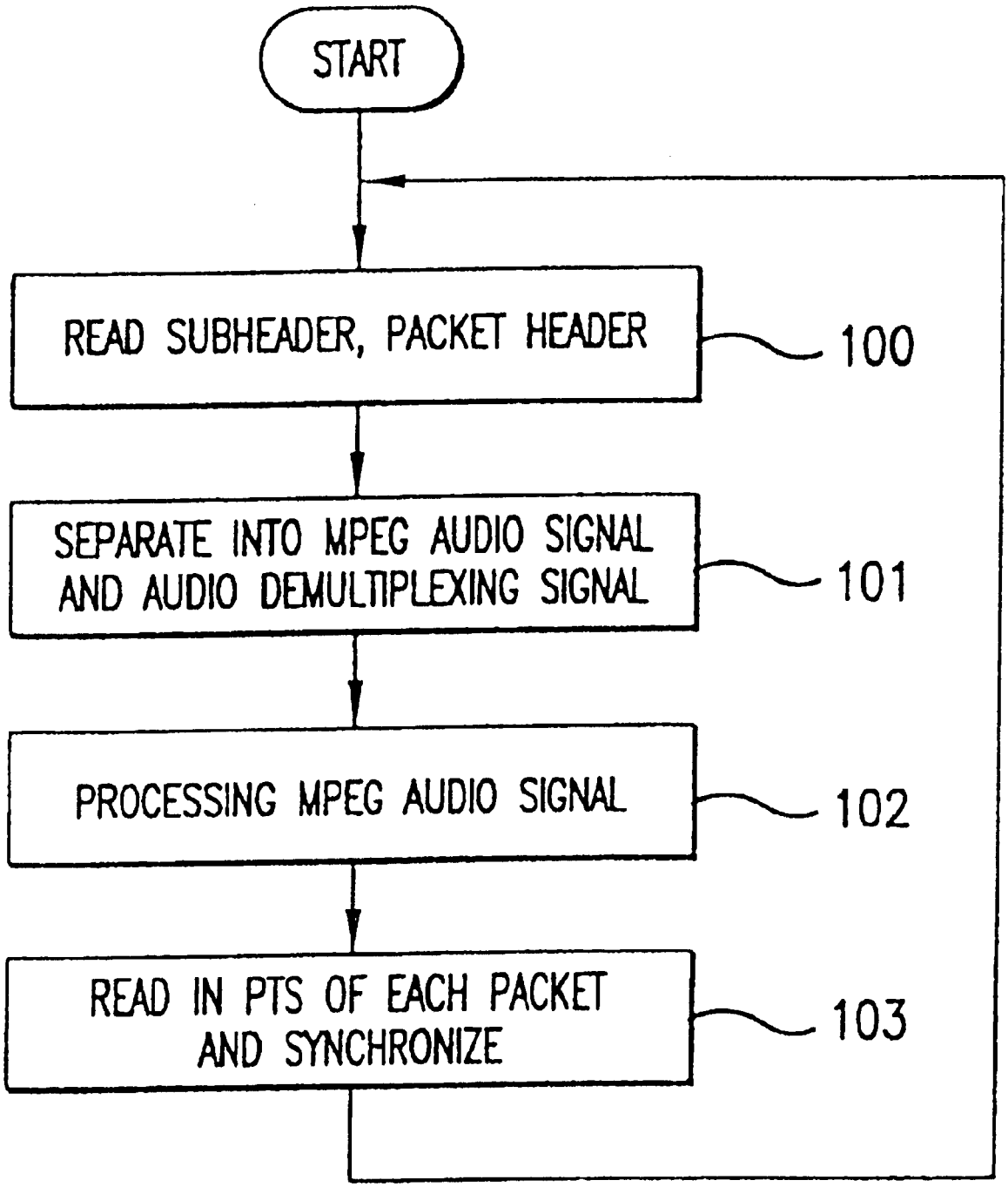
FIG. 7 is an operational flow diagram of a device for controlling karaoke CD audio signals.

Operation of a karaoke CD audio system is to be explained hereinafter, referring to FIG. 7.

First, a subheader and packet header are read 100, and demultiplexing is carried out to separate into an audio demultiplexing signal and a MPEG audio signal 101. The separated MPEG audio signal is decoded to separate into audio signals containing accompaniment sound only, and audio signals containing both vocal sound and accompaniment sound using the audio demultiplexing signal 102, and the PTS of each packet is read to synchronize and transmit signals 103.

Figure 8:
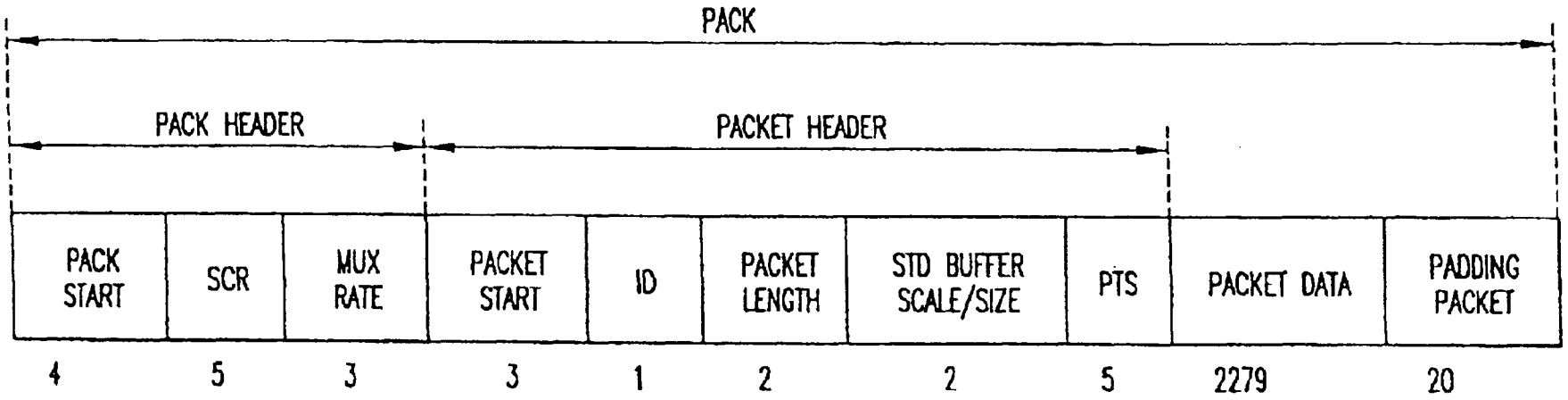
FIG. 8 is an MPEG audio format in accordance with this invention.

The MPEG audio format, as shown in FIG. 8, generates separated MPEG audio signals Aa and Ab, and audio demultiplexing signals by extracting coding information from the subheaders of each sector, and by reading the packet header and comparing it to the STC, thereby the presentation time of the data can be controlled.

As has been explained, this invention for a karaoke CD system increases the enjoyment of karaoke by reproducing audio data containing a player's voice, i.e., vocal sound and accompaniment sound, and audio data containing accompaniment sound selectively, which permits stereophony sound corresponding to the CD sound.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

[1. A device for reproducing a digital signal recorded on a medium, the digital signal including a video signal and an audio signal, the audio signal being composed of data units, the data units corresponding to at least one of:

1) a first type of digital audio data, and 2) a second type of digital audio data which includes at least one content different from the first type of digital audio data;

each data unit including attribute information, which has:

a) first information indicating a coding mode of the digital audio data, and b) second information, different than said first information, identifying the data unit as one of the first type of digital audio data or the second type of digital audio data;

the data units of audio signal being interleaved between data units of video signal, comprising:

a demodulator for demodulating the digital signal to restore an original signal;

a signal processor for receiving the audio signal, demodulated by the demodulator, extracting the second information, separating the data units corresponding to a first type of audio signal from data units corresponding to a second type of audio signal based on the extracted second information, said signal processor including a system time clock, a memory for storing the data units corresponding to the first type and the second type of audio signal, and first or second audio presentation parts receiving the system time clock to control a presentation timing of the first type or the second type of audio signal; and a controller, coupled to the signal processor, controlling the signal processor to output the data units corresponding to the first type or the second type of the audio signal designated by a user input, wherein the first or second type of audio signal, designated by the user input, is identified using the second information.]

[2. A device as claimed in claim 1, wherein the first type of audio signal corresponds to accompaniment sound.]

[3. A device as claimed in claim 1, wherein the audio signal is encoded by an MPEG coding mode, wherein the signal processor further comprises:

an MPEG audio decoder for decoding the audio signal.]

[4. A method for reproducing a digital signal recorded on a medium, said digital signal including a video signal and an audio signal, the audio signal being composed of data units, the data units corresponding to at least one of:

1) a first type of digital audio data, and 2) a second type of digital audio data which includes at least one content different from the first type of digital audio data;

each data unit including attribute information, which has:

a) first information indicating a coding mode of the digital audio data, and b) second information, different than said first information, identifying the data unit as one of the first type of digital audio data or the second type of digital audio data;

the data units of audio signal being interleaved between data units of video signal, the method comprising the steps of:

demodulating the digital signal to restore an original signal;

receiving the demodulated audio signal;

extracting the second information;

separating the data units corresponding to a first type of audio signal from data units corresponding to a second type of audio signal based on the extracted second information, by storing the first and second types of audio signals in a memory, receiving the data units corresponding to the first and second types of audio signals in first and second audio presentation parts along with a system time clock to control a presentation timing of the first or second type of audio signal; and outputting one of the first or second types of audio signals in response to a user input designating one of the first or second types of audio signals, wherein the first or second type of audio signal, designated by the user input, is identified using the second information.]

[5. The method of claim 4, wherein the step of separating includes separating the first type of the audio signal representing accompaniment sound.]

[6. A device for processing a digital signal, comprising:

an audio signal processor receiving data units of digital audio data, the data units corresponding to at least one of:

1) a first type of digital audio data, and 2) a second type of digital audio data which includes at least one content different from the first type of digital audio data;

each data unit including attribute information, which has:

a) coding information indicating a coding mode of the digital audio data, and b) identification information, different than said coding information, identifying the data unit as one of the first type of digital audio data or the second type of digital audio data;

the audio signal processor extracting the identification information, and separating the data units of the first type from the data units of the second type using the identification information, said signal processor including a system time clock, a memory for storing the data units of the first type and the second type, and first and second audio presentation parts receiving the system time clock to control a presentation timing of the data units of the first type or the second type; and a control circuit controlling the audio signal processor to output an audio signal corresponding to the data units of one of the first or second types, based on the identification information.]

[7. The device of claim 6, wherein the audio data of the first type includes accompaniment sound.]

[8. The device of claim 6, wherein the data units of digital audio data are interleaved with digital video data, and wherein the audio data of the first type includes accompaniment sound and vocals, which are associated with the digital video data.]

[9. The device of claim 6, wherein the audio signal processor compares the system time clock to timing information in the digital audio data, and outputs audio data with a timing based on the comparison.]

[10. The device of claim 6, wherein the audio signal processor MPEG decodes the audio data.]

[11. The device of claim 6, further comprising:

a demodulator demodulating the digital audio data prior to receipt by the audio signal processor.]

[12. A method for processing a digital signal, comprising:

receiving data units of digital audio data, the data units corresponding to at least one of:

1) a first type of digital audio data, and 2) a second type of digital audio data which includes at least one content different from the first type of digital audio data;

each data unit including attribute information, which has:

a) coding information indicating a coding mode of the digital audio data, and b) identification information, different than said coding information, identifying the data unit as one of the first type of digital audio data or the second type of digital audio data;

extracting the identification information;

separating the data units of the first type from the data units of the second type using the identification information by storing the data units of the first and second types in a memory, receiving the data units of the first and second types in first or second audio presentation parts along with a system time clock to control a presentation timing of data units of the first or second type; and outputting audio data corresponding to the data units of the first or second type in response to the identification information.]

[13. The method of claim 12, wherein the audio data of the first type includes accompaniment sound.]

[14. The method of claim 12, wherein the data units of digital audio data are interleaved with digital video data, and wherein the audio data of the first type includes accompaniment sound and vocals, which are associated with the digital video data.]

[15. The method of claim 12, further comprising:

comparing the system time clock to timing information in the digital audio data; and outputting the audio data with a timing based on the comparison.]

[16. The device of claim 12, wherein the separating step includes MPEG decoding the audio data.]

[17. The device of claim 1, wherein the signal processor includes a switch that selectively outputs the data units of the first type or the second type.]

*18. A recording medium on which digital video data and digital audio data are recorded, the digital video data comprising data units, and the digital audio data comprising data units corresponding to at least one of:*

*a first type of digital audio data; and*

*a second type of digital audio data which includes at least one content different from the first type of digital audio data;*

*each data unit of digital audio data including supplementary information, which has:*

*coding information for indicating a coding mode of the digital audio data,*

*identification information, different than said coding information, for identifying one of the first type of digital audio data or the second type of digital audio data, wherein the identification information is used for separating the data units of the first type from the data units of the second type and selectively outputting the first or second types of digital audio data, and time information for representing a presentation timing of data units of the first type or second type so that the selected digital audio data is output together with the digital video data in synchronous manner,*

*wherein one digital video data is associated with the two types of digital audio data.*

*19. The recording medium of claim 18, wherein the data unit corresponds to a pack or packet.*

*20. The recording medium of claim 19, wherein the supplementary information is included in a header of the pack or packet.*

*21. The recording medium of claim 18, wherein the first or the second type of digital audio data is interleaved with digital video data.*

*22. The recording medium of claim 18, wherein the data units correspond to packets that are multiplexed with each other.*

*23. The recording medium of claim 18, wherein the coding mode is a coding mode for indicating a MPEG format.*

*24. The recording medium of claim 18, wherein the time information includes a PTS (Presentation Time Stamp).*

*25. The recording medium of claim 18, wherein the digital audio data of the first type includes accompaniment sound.*

*26. The recording medium of claim 18, wherein the digital audio data of the second type includes accompaniment sound and vocal sound.*

*27. An apparatus for reproducing a digital data, the digital data including a digital video data and a digital audio data, the digital video data and the digital audio data being composed of data units respectively, and the data units of digital audio data corresponding to at least one of:*

*1) a first type of digital audio data, and*

*2) a second type of digital audio data which includes at least one content different from the first type of digital audio data;*

*the digital data including a mode information for indicating a coding mode of the digital video data, and attribute information, which has:*

*a) first information for indicating a coding mode of the digital audio data, and*

*b) second information, different than said first information, for identifying one of the first type of digital audio data and the second type of digital audio data, the apparatus comprising:*

*a demultiplexer configured to separate the digital video data from the digital audio data;*

*a data processor configured to process the digital video data and at least one of the first and second types of digital audio data;*

*an audio/video presentation part configured to compare a system time reference with a presentation time information to control a presentation timing of the digital video data and compare the system time reference with a presentation time information to control a presentation timing of at least one of the first and second types of digital audio data, the system time reference being provided by a system time clock circuit; and*

*a control circuit coupled to the data processor and the audio/video presentation part to output a video data and an audio data corresponding to the first or second types, based on the second information.*

*28. The apparatus of claim 27, further comprising:*

*a data storage configured to store the digital video data and the digital audio data separated by the demultiplexer, respectively, wherein the two types of digital audio data are stored in the data storage.*

*29. The apparatus of claim 28, wherein the digital video data and the digital audio data compressed by an MPEG coding mode are identified by the mode information and the first information, and wherein the data processor includes:*

*an MPEG decoder configured to decode the compressed digital video data and the compressed digital audio data.*

*30. The apparatus of claim 29, further comprising:*

*a D/A converter coupled to the audio/video presentation part to convert the digital video data and the first or second types of digital audio data to analog signal, respectively.*

*31. The apparatus of claim 27, further comprising:*

*a demodulator configured to demodulate the digital video data and the digital audio data modulated by a predetermined modulation method, prior to separating the digital video data and the digital audio data by the demultiplexer.*

*32. The apparatus of claim 27, wherein the audio/video presentation part includes a first presentation part for the first type of the digital audio data, and a second presentation part for the second type of the digital audio data.*

*33. The apparatus of claim 27, wherein the demultiplexer is configured to separate the first type of digital audio data from the second type of digital audio data, using the second information.*

*34. The apparatus of claim 27, wherein the demultiplexer is further configured to separate a header from each data unit of digital video data and the digital audio data, the header in at least one of data unit of digital video data and data unit of the digital video data including the system time reference, while the presentation time information being included in both header of unit of digital video data and header of unit of the digital audio data.*

*35. The apparatus of claim 27, wherein the control circuit is further configured to receive a command for designating at least one of first and second types of digital audio data, and control the data processor and the audio/video presentation part to output the designated audio type , and wherein the first or second type of digital audio data, designated by the command, is identified using the second information.*

*36. The apparatus of claim 35, wherein the control circuit is further configured to control the audio/video presentation part such that the digital video data and the designated digital audio data are output in synchronized manner.*

*37. A method of reproducing a digital data, the digital data including a digital video data and a digital audio data, the digital video data and the digital audio data being composed of data units respectively, and the data units of digital audio data corresponding to at least one of:*

*1) a first type of digital audio data, and*

*2) a second type of digital audio data which includes at least one content different from the first type of digital audio data:*

*the digital data including a mode information for indicating a coding mode of the digital video data, and attribute information, which has:*

*a) first information for indicating the digital audio data, and*

*b) second information, different than said first information, for identifying one of the first type of digital audio data or the second type of digital audio data, the method comprising:*

*separating the digital video data from the digital audio data;*

*processing the digital video data and at least one of the first and second types of digital audio data;*

*comparing a system time reference with a presentation time information to control a presentation timing of the digital video data and comparing the system time reference with a presentation time information to control a presentation timing of at least one of the first and second types of digital audio data; and*

*controlling an output of a video data, and an audio data corresponding to the first or second types, based on the second information.*

*38. The method of claim 37, further comprising:*

*storing the digital video data and the digital audio data separated by the separating step, in a data storage, wherein the two types of digital audio data are stored in the data storage.*

*39. The method of claim 38, wherein the digital video data and the digital audio data compressed by an MPEG coding mode are identified by the mode information and the first information, and the processing step includes decoding the compressed digital video data and the compressed digital audio data.*

*40. The method of claim 39, further comprising:*

*converting the digital video data and the first or second types of digital audio data to analog signal, respectively.*

*41. The method of claim 37, further comprising:*

*demodulating the digital video data and the digital audio data modulated by a predetermined modulation method, prior to separating the digital video data and the digital audio data in the separating step.*

*42. The method of claim 37, wherein the separating step further separates the first type of digital audio data from the second type of digital audio data, using the second information.*

*43. The method of claim 37, wherein the separating step further separates a header from each data unit of digital video data and the digital audio data, the header in at least one of data unit of digital video data and data unit of the digital video data including the system time reference, while the presentation time information being included in both header of unit of digital video data and header of unit of the digital audio data.*

*44. The method of claim 37, wherein the controlling step further includes receiving a command for designating at least one of the first and second types of digital audio data, and controlling an output of the designated audio type, wherein the first or second type of digital audio data, designated by the command, is identified using the second information.*

*45. The method of claim 44, wherein the controlling step further controls such that the digital video data and the designated digital audio data are output in synchronized manner.*

*46. An apparatus for processing a digital data, the digital data including a compressed digital video data and a compressed digital audio data, the digital video data and audio data being composed of data units respectively, data units of digital audio data being multiplexed along with data units of digital video data, and the data units of digital audio data corresponding to at least one of:*

*1) a first type of digital audio data, and*

*2) a second type of digital audio data which includes at least one content different from the first type of digital audio data;*

*the digital data including ID information for indicating the digital video data, and attribute information, which has:*

*a) first information for indicating a coding mode of the digital audio data, and*

*b) second information, different than said first information, for identifying one of the first type of digital audio data or the second type of digital audio data, the apparatus comprising:*

*a demultiplexer configured to separate the data units of the digital video data from the data units of the digital audio data;*

*a data storage configured to store the digital video data and the digital audio data separated by the demultiplexer, respectively;*

*a data processor configured to receive the digital video data and at least one of the first and second types of digital audio data stored in the data storage and process the digital video data and at least one of the first and second types of digital audio data, respectively, the data processor including a decoder configured to decode the compressed digital video data and the compressed digital audio data;*

*an audio/video presentation part configured to compare a system time reference with a presentation time information to control a presentation timing of the digital video data and compare the system time reference with a pre-*

*sentation time information to control a presentation timing of at least one of the first and second types of digital audio data, the system time reference being provided by a system time clock circuit; and*

*a control circuit coupled to the data processor and the audio/video presentation part to output a video data and an audio data corresponding to the first or second types, based on the second information.*

*47. The apparatus of claim 46, further comprising:*

*a D/A converter coupled to the audio/video presentation part to convert the digital video data and the first or second types of digital audio data to analog signal respectively.*

*48. The apparatus of claim 46, further comprising:*

*a demodulator configured to demodulate the digital video data and the digital audio data modulated by a predetermined modulation method, prior to separating the digital video data and the digital audio data by the demultiplexer.*

*49. The apparatus of claim 46, wherein the audio/video presentation part includes a first presentation part for the first type of the digital audio data and a second presentation part for the second type of the digital audio data.*

*50. The apparatus of claim 46, wherein the demultiplexer is configured to separate the digital video data from the digital audio data, using the ID information and the second information.*

*51. The apparatus of claim 50, wherein the demultiplexer is further configured to separate the first type of digital audio data from the second type of digital audio data, using the second information.*

*52. The apparatus of claim 46, wherein the demultiplexer is further configured to separate a header from each data unit of digital video data and the digital audio data, the header in at least one of data unit of digital video data and data unit of the digital audio data including the system time reference, while the presentation time information being included in both header of data unit of digital video data and header of data unit of the digital audio data.*

*53. The apparatus of claim 46, where the control circuit is further configured to receive a command for designating at least one of the first and second types of digital audio data, and control the data processor and the audio/video presentation part to output the designated audio type, and wherein the first or second type of digital audio data, designated by the command, is identified using the second information.*

*54. The apparatus of claim 53, wherein the control circuit is further configured to control the audio/video presentation part such that the digital video data and the designated digital audio data are output in synchronized manner.*

*55. The apparatus of claim 46, wherein the data processor is configured to receive the first and second types of digital audio data and decode the first and second types of digital audio data simultaneously.*

*56. A method of processing a digital data, the digital data including a compressed digital video data and a compressed digital audio data, the digital video data and audio data being composed of data units respectively, data units of digital audio data being multiplexed along with data units of digital video data, and the data units of digital audio data corresponding to at least one of:*

*1) a first type of digital audio data, and*

*2) a second type of digital audio data which includes at least one content different from the first type of digital audio data;*

*the digital data including ID information for indicating the digital video data, and attribute information, which has:*

*a) first information for indicating the digital audio data, and*

*b) second information, different than said first information, for identifying one of the first type of digital audio data or the second type of digital audio data, the method comprising:*

*separating the data units of the digital video data from the data units of the digital audio data;*

*storing the digital video data and the digital audio data separated by the separating step, respectively;*

*processing the digital video data and at least one of the first and second types of digital audio data, respectively, the processing step including decoding the compressed digital video data and the compressed digital audio data;*

*comparing a system time reference with a presentation time information to control a presentation timing of the digital video data and comparing the system time reference with a presentation time information to control a presentation timing of at least one of the first and second types of digital audio data: and*

*controlling an output of a video data and an audio data corresponding to the first or second types, based on the second information.*

*57. The method of claim 56, further comprising:*

*converting the digital video data and the first or second types of digital audio data to analog signal, respectively.*

*58. The method of claim 56, further comprising:*

*demodulating the digital video data and the digital audio data modulated by a predetermined modulation method, prior to the separating step.*

*59. The method of claim 56, wherein the separating step separates the digital video data from the digital audio data, using the ID information and the second information.*

*60. The method of claim 59, wherein the separating step further separates the first type of digital audio data from the second type of digital audio data, using the second information.*

*61. The method of claim 56, wherein the separating step separates a header from each data unit of digital video data and the digital audio data, the header in at least one of data unit of digital video data and data unit of the digital audio data including the system time reference, while the presentation time information being included in both header of data unit of digital video data and header of data unit of the digital audio data.*

*62. The method of claim 56, wherein the controlling step further includes receiving a command for designating at least one of the first and second types of digital audio data, and controlling the output of the designated audio type, and*

*wherein the first or second type of digital audio data, designated by the command, is identified using the second information.*

*63. The method of claim 62, wherein the controlling step further controls such that the digital video data and the designated digital audio data are output in synchronized manner.*

*64. The method of claim 56, wherein the processing step decodes the first and second types of digital audio data simultaneously.*

* * * * *